(12) United States Patent
Chang et al.

(10) Patent No.: US 11,023,057 B2
(45) Date of Patent: Jun. 1, 2021

(54) STYLUS STRUCTURE HAVING A BARRIER UNIT FOR CONTACTING WITH A TRIGGER COMPONENT

(71) Applicant: Waltop International Corporation, Hsinchu (TW)

(72) Inventors: Yi-Chih Chang, Hsinchu (TW); Ju-Ming Lin, Hsinchu (TW); Ying-Hwa Tang, Hsinchu (TW)

(73) Assignee: WALTOP INTERNATIONAL CORPORATION, Hsinchu (TW)

( * ) Notice: Subject to any disclaimer, the term of this patent is extended or adjusted under 35 U.S.C. 154(b) by 0 days.

(21) Appl. No.: 16/803,309

(22) Filed: Feb. 27, 2020

(65) Prior Publication Data

US 2021/0124436 A1    Apr. 29, 2021

(30) Foreign Application Priority Data

Oct. 23, 2019 (TW) ................................ 108138241

(51) Int. Cl.
*G06F 3/0354* (2013.01)
*G06F 3/041* (2006.01)

(52) U.S. Cl.
CPC ........ *G06F 3/03545* (2013.01); *G06F 3/0416* (2013.01)

(58) Field of Classification Search
CPC .................................................. G06F 3/03545
See application file for complete search history.

(56) References Cited

U.S. PATENT DOCUMENTS

| 5,369,262 A | * | 11/1994 | Dvorkis | G06F 3/03543 235/440 |
| 5,475,401 A | * | 12/1995 | Verrier | G06F 3/03545 345/179 |
| 2005/0252924 A1 | * | 11/2005 | Pieper | A61J 7/0481 221/25 |
| 2014/0055425 A1 | * | 2/2014 | Li | G06F 3/046 345/179 |
| 2015/0084934 A1 | * | 3/2015 | Ho | G06F 3/03545 345/179 |
| 2015/0091844 A1 | * | 4/2015 | Ho | G06F 3/03545 345/174 |
| 2015/0153848 A1 | * | 6/2015 | Lien | G06F 3/03545 345/173 |

(Continued)

*Primary Examiner* — Chun-Nan Lin
(74) *Attorney, Agent, or Firm* — Li & Cai Intellectual Property (USA) Office (57) ABSTRACT

A stylus structure includes a stylus housing unit, a stylus cover unit, a control unit, and a barrier unit. The stylus housing unit has an accommodating space and an opening that are in spatial communication with each other. The stylus cover unit is detachably sleeved on the stylus housing unit. The control unit includes a processing component and a trigger component electrically connected to the processing component. The barrier unit in the accommodating space contacts the trigger component, and therefore the processing component is in a power OFF state. In another aspect, the stylus structure includes a stylus housing unit, a control unit, and a barrier unit. The control unit includes a processing component and electrically connects to a trigger component. The barrier unit in the stylus housing unit contacts the trigger component, and therefore the processing component is in a power OFF state.

4 Claims, 11 Drawing Sheets

(56) References Cited

U.S. PATENT DOCUMENTS

| | | | |
|---|---|---|---|
| 2015/0378456 A1* | 12/2015 | Ho | G06F 3/03545 |
| | | | 345/174 |
| 2017/0075440 A1* | 3/2017 | Chang | G06F 3/03545 |
| 2017/0108948 A1* | 4/2017 | Tang | G06F 3/041 |
| 2017/0108953 A1* | 4/2017 | Mao | G06F 3/03545 |
| 2017/0108956 A1* | 4/2017 | Tang | G06F 3/0383 |
| 2017/0242501 A1* | 8/2017 | Tang | G06F 3/03545 |
| 2018/0181218 A1* | 6/2018 | Lin | G06F 3/03545 |
| 2018/0260048 A1* | 9/2018 | Chang | G06F 3/03545 |
| 2019/0056806 A1* | 2/2019 | Yeh | G06F 3/03545 |

\* cited by examiner

STYLUS STRUCTURE HAVING A BARRIER UNIT FOR CONTACTING WITH A TRIGGER COMPONENT

CROSS-REFERENCE TO RELATED PATENT APPLICATION

This application claims the benefit of priority to Taiwan Patent Application No. 108138241, filed on Oct. 23, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a stylus structure, and more particularly to a stylus structure with a power OFF function.

BACKGROUND OF THE DISCLOSURE

The conventional stylus pens on the market either lack proper protection or are already in a power ON state after being produced. Therefore, the stylus pens may lose power due to human factors or external factors after being distributed from a manufacturer and before being delivered to a user. Consequently, the user cannot use the stylus pen immediately after purchase, and instead, the user must to recharge it or replace the battery therein, therefore resulting in inconveniences for the user.

SUMMARY OF THE DISCLOSURE

In response to the above-referenced technical inadequacies, the present disclosure provides a stylus structure with a power OFF function.

In one aspect, the present disclosure provides a stylus structure including a stylus housing unit, a stylus cover unit, a control unit, and a barrier unit. The stylus housing unit has an accommodating space and an opening, and the opening is in spatial communication with the accommodating space. The stylus cover unit is detachably sleeved on the stylus housing unit. The control unit includes a processing component located in the accommodating space and a trigger component electrically connected to the processing component. The barrier unit is located in the accommodating space, and is in contact with the trigger component. The processing component is in a power OFF state when the trigger component is in contact with the barrier unit.

In another aspect, the present disclosure provides a stylus structure including a stylus housing unit, a control unit, and a barrier unit. The control unit includes a processing component located in the stylus housing unit, and the control unit is electrically connected to a trigger component of the processing component. The barrier unit is located in the stylus housing unit, and the barrier unit is in contact with the trigger component. The processing component is in a power OFF state when the trigger component is in contact with the barrier unit.

Therefore, one beneficial effect of the present disclosure is that the stylus structure provided in the present disclosure can achieve a power OFF function through the foregoing aspects.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
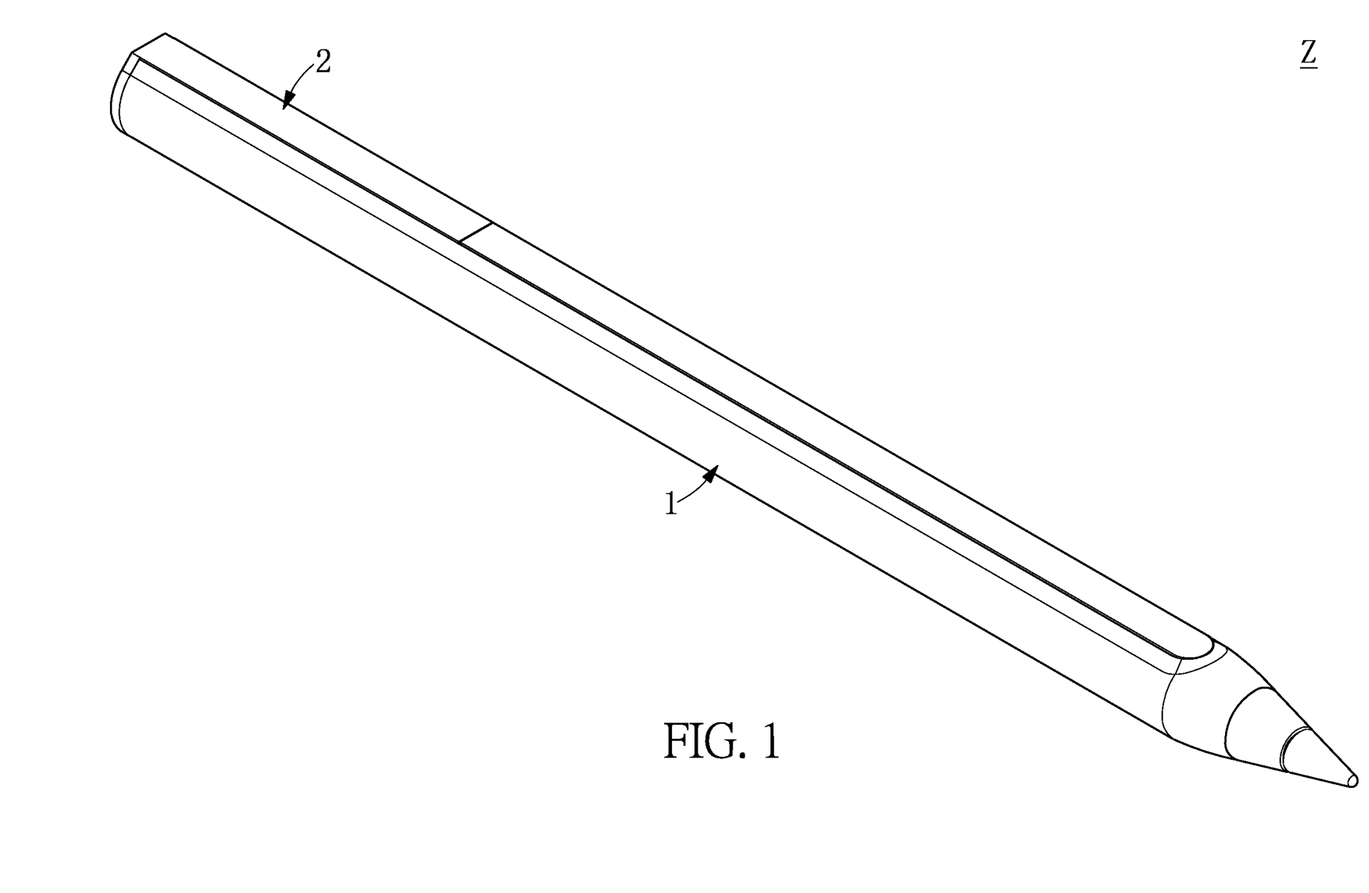
FIG. 1 is a perspective view of a stylus structure according to a first embodiment of the present disclosure.
Figure 2:
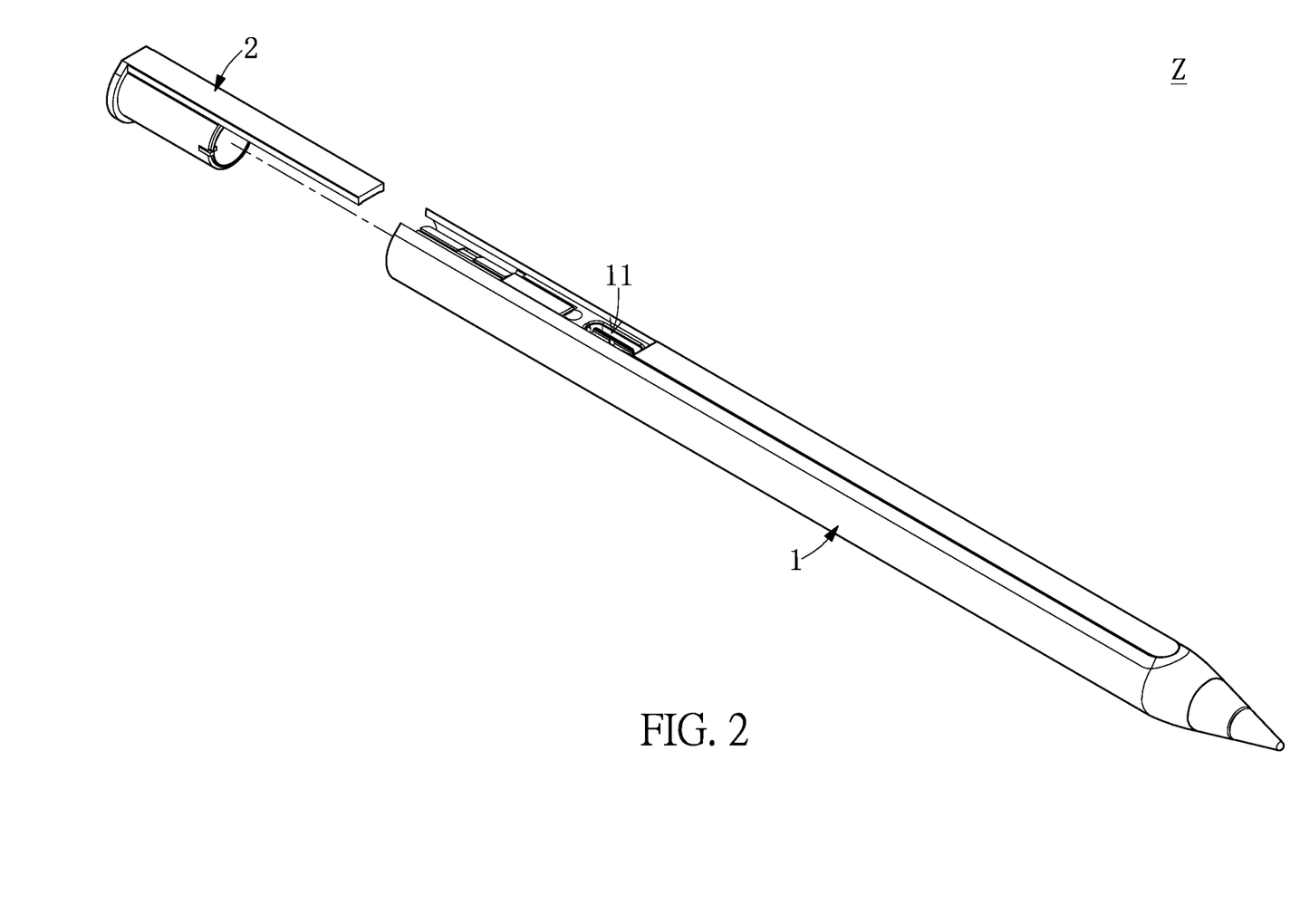
FIG. 2 is a schematic view of the stylus structure in an operating state according to the first embodiment of the present disclosure.
Figure 3:
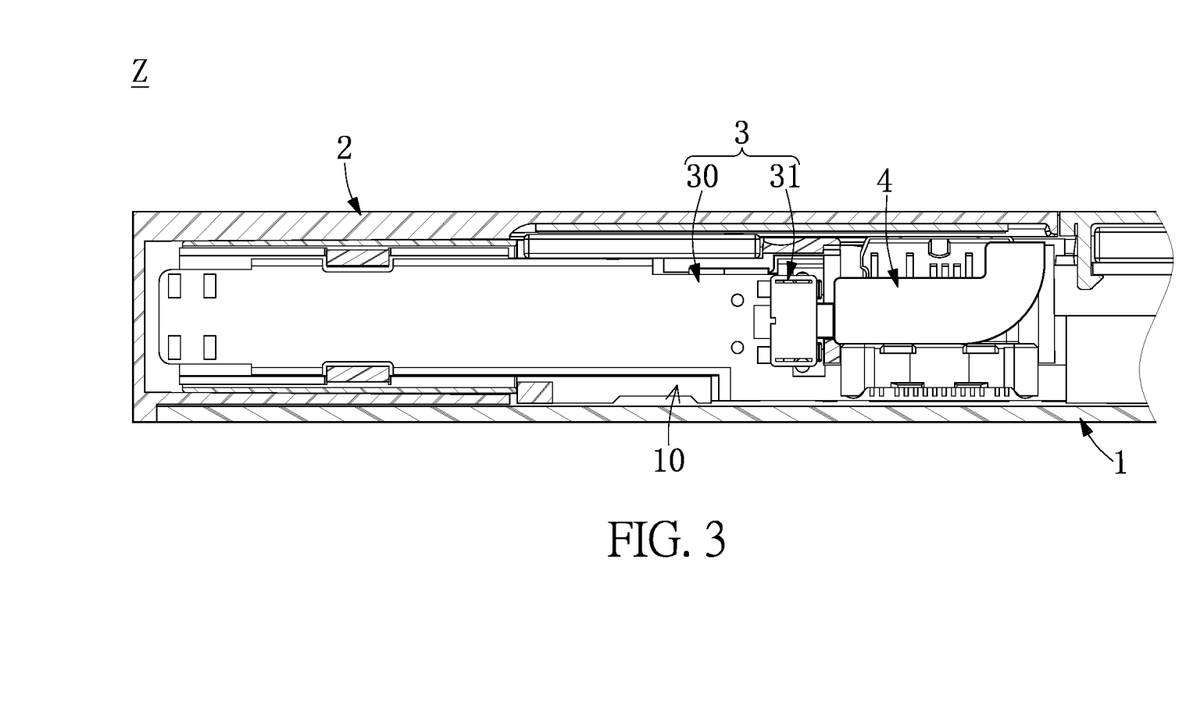
FIG. 3 is a partial sectional view of the stylus structure according to the first embodiment of the present disclosure.
Figure 4:
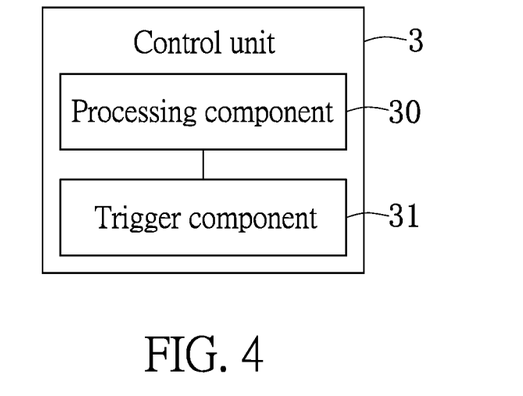
FIG. 4 is a functional block diagram of the stylus structure according to the first embodiment of the present disclosure.

Reference is made to FIG. 1 to FIG. 4. FIG. 1, FIG. 3, and FIG. 4 are a perspective view, a partial sectional view and a functional block diagram of a stylus structure according to a first embodiment of the present disclosure, respectively. FIG. 2 is a schematic view of the stylus structure in an operating state according to the first embodiment of the present disclosure. The first embodiment of the present disclosure provides a stylus structure Z. The stylus structure Z includes a stylus housing unit 1, a stylus cover unit 2, a control unit 3, and a barrier unit 4. The stylus housing unit 1 has an accommodating space 10 and an opening 11. The accommodating space 10 is in spatial communication with the opening 11. The stylus cover unit 2 is detachably sleeved on the stylus housing unit 1. The control unit 3 includes a processing component 30 located in the accommodating space 10 and a trigger component 31 electrically connected to the processing component 30. The barrier unit 4 is located in the accommodating space 10, and the barrier unit 4 is in contact with the trigger component 31. The processing component 30 is in a power OFF state when the trigger component 31 is in contact with the barrier unit 4.

Specifically, the stylus structure Z provided in the present embodiment includes a stylus housing unit 1, a stylus cover unit 2, a control unit 3, and a barrier unit 4. The processing component 30 can be a printed circuit board (PCB) or a component with processing and calculating functions, but is not limited thereto. The barrier unit 4 can be located in the accommodating space 10 and in contact with the trigger component 31.

Second Embodiment

Figure 5:
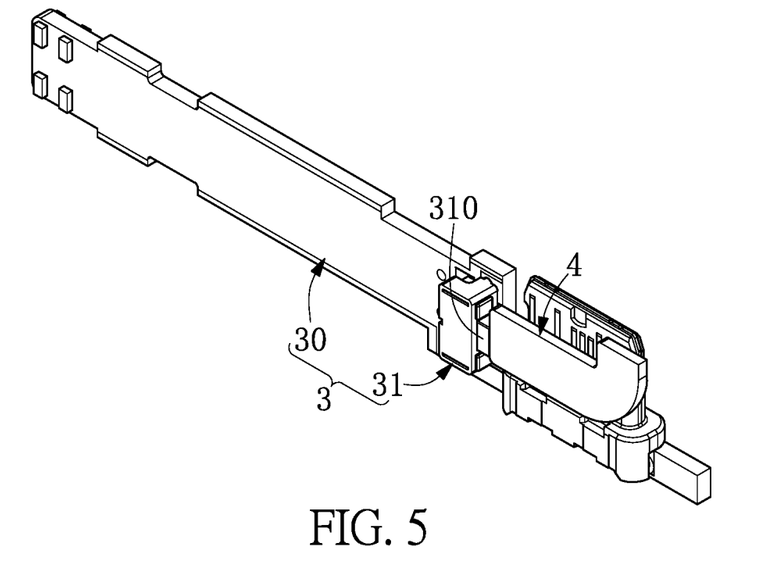
FIG. 5 is a perspective view of a control unit and a barrier unit of a second embodiment of the present disclosure.
Figure 6:
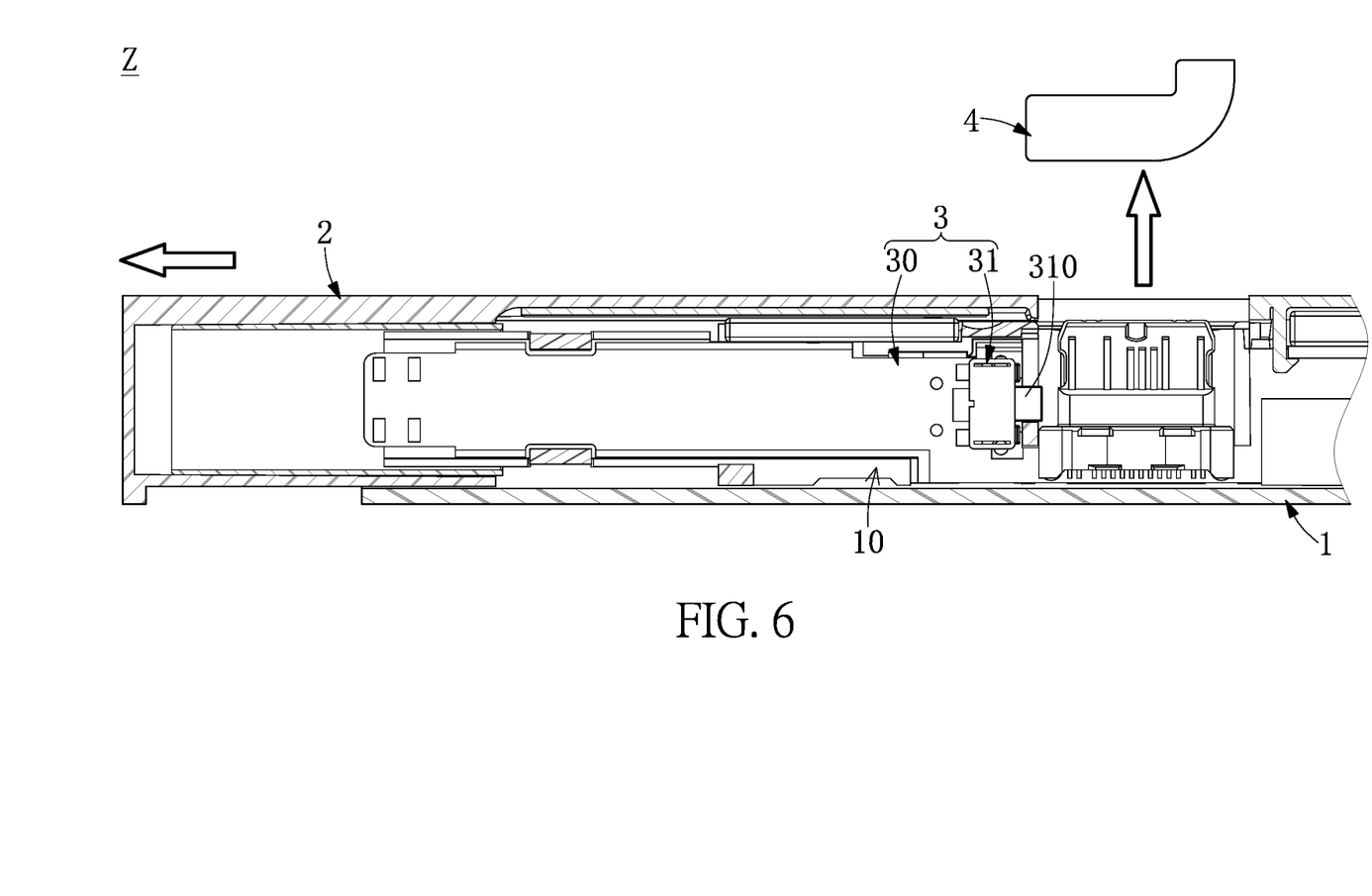
FIG. 6 is a partial sectional view of a stylus structure of the second embodiment of the present disclosure.

Reference is made to FIG. 5 and FIG. 6, which are a perspective view of the control unit and the barrier unit and a partial sectional view of the stylus structure according to a second embodiment of the present disclosure, and are to be read in conjunction with FIG. 1 to FIG. 4. In the stylus structure Z of the present embodiment, the working principles of the same components and those of the stylus structure Z of the first embodiment are similar, and descriptions thereof will be omitted herein. It should be noted that, in the present embodiment, the barrier unit 4 abuts against a trigger part 310 of the trigger component 31, so that the trigger component 31 can be in a circuit OFF state, and the processing component 30 is in the power OFF state when the trigger component 31 is in the circuit OFF state.

For instance, the barrier unit 4 provided in the present disclosure can be a hard plate with a certain thickness and can be L-shaped, but is not limited thereto. One end of the barrier unit 4 abuts against the trigger part 310 of the trigger component 31, and another end of the barrier unit 4 is in contact with a surface of the inner wall of the stylus housing unit 1 or a component (which is omitted in the figures of the present disclosure) inside the stylus housing unit 1. In addition, the trigger component 31 can be a switch component but is not limited thereto. Therefore, the processing component 30 is in the power OFF state when the trigger component 31 is in the circuit OFF state due to the trigger part 310 of the trigger component 31 being pressed by the barrier unit 4.

In addition, the processing component 30 changes to the operating state from the power OFF state when the trigger component 31 is in a circuit ON state due to the barrier unit 4 being away from the trigger part 310.

For instance, referring to FIG. 2, FIG. 3, and FIG. 6, when a user wishes to use the stylus structure Z, the user can partially detach the stylus cover unit 2 from the stylus housing unit 1 to expose the opening 11. Further, the barrier unit 4 can be moved away from the trigger part 310, so that the trigger component 31 can change to the circuit ON state from the circuit OFF state when the trigger part 310 is not pressed by a first main body 40. At this time, the processing component 30 changes to the operating state or a power ON state when the trigger component 31 is in the circuit ON state. Furthermore, the stylus cover unit 2 can be reattached to the stylus housing unit 1 to cover the opening 11, and the stylus structure Z can then be ready for use. It should be noted that a tab (which is omitted in the figures of the present disclosure) can be disposed on an end of the barrier unit 4 distal from the trigger part 310, and the tab extends to the outside of the stylus housing unit 1 through the opening 11. Therefore, by pulling the tab, the barrier unit 4 can be dragged away from the trigger part 310. Moreover, the barrier unit 4 can be separated from the stylus housing unit 1 through the opening 11, but is not limited thereto.

Third Embodiment

Reference is made to FIG. 7 to FIG. 10, which are a perspective view of the control unit and the barrier unit, a partial sectional view of the stylus structure in the circuit OFF state, a partial sectional view of the stylus structure in the circuit ON state, and a functional block diagram of the stylus structure according to a third embodiment of the present disclosure, and are to be read in conjunction with FIG. 1 to FIG. 6. In the stylus structure Z of the present embodiment, the working principles of the same components and those of the stylus structure Z of the above-mentioned embodiments are similar, and descriptions thereof will be omitted herein. It should be noted that in the present embodiment, the trigger component 31 includes a first conductive member 311 and a second conductive member 312 that are electrically connected to the processing component 30. Moreover, the barrier unit 4 includes a main body 40 and a shield member 41 connected to the main body 40. The first conductive member 311 and the second conductive member 312 are in contact with the shield member 41 and thus are in the circuit OFF state, and therefore the processing component 30 is in the power OFF state.

In addition, the processing component 30 has a conductive part 300. When the shield member 41 is away from the first conductive member 311 and the second conductive member 312, the first conductive member 311 and the second conductive member 312 are electrically connected to each other through the conductive part 300 and changes to the circuit ON state from the circuit OFF state. The processing component 30 changes to the operating state from the power OFF state when the first conductive member 311 and the second conductive member 312 are in the circuit ON state.

Figure 7:
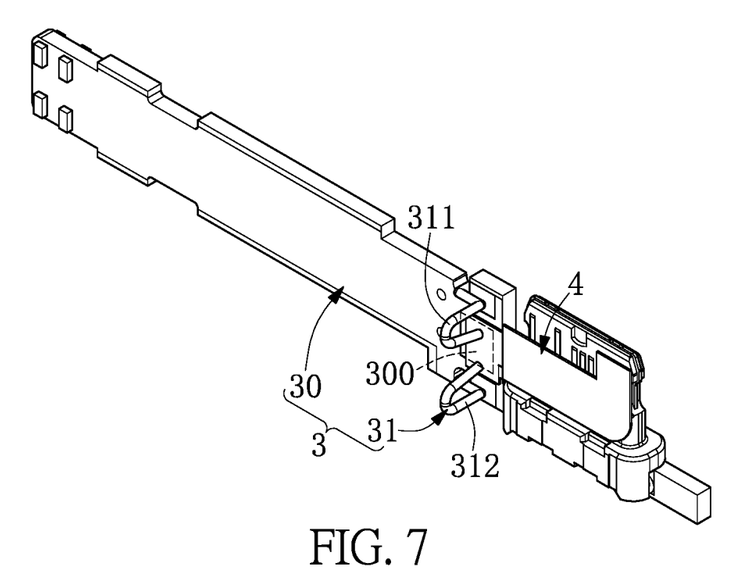
FIG. 7 is a perspective view of a control unit and a barrier unit of a third embodiment of the present disclosure.
Figure 8:
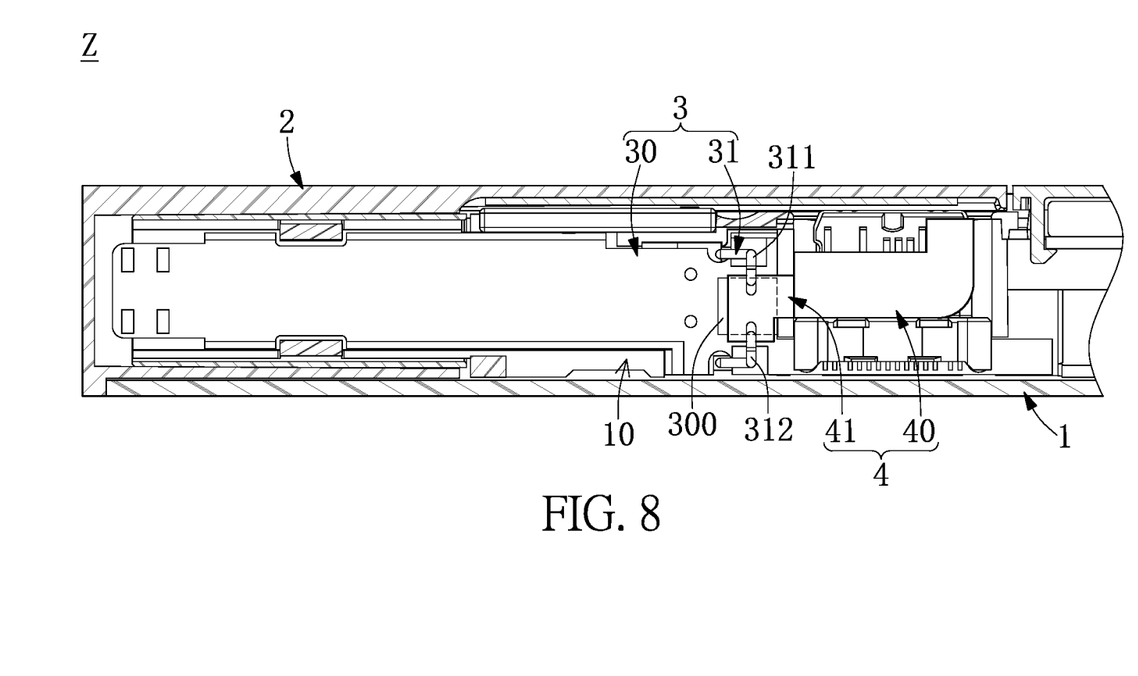
FIG. 8 is a partial sectional view of a stylus structure in a circuit OFF state according to the third embodiment of the present disclosure.
Figure 9:
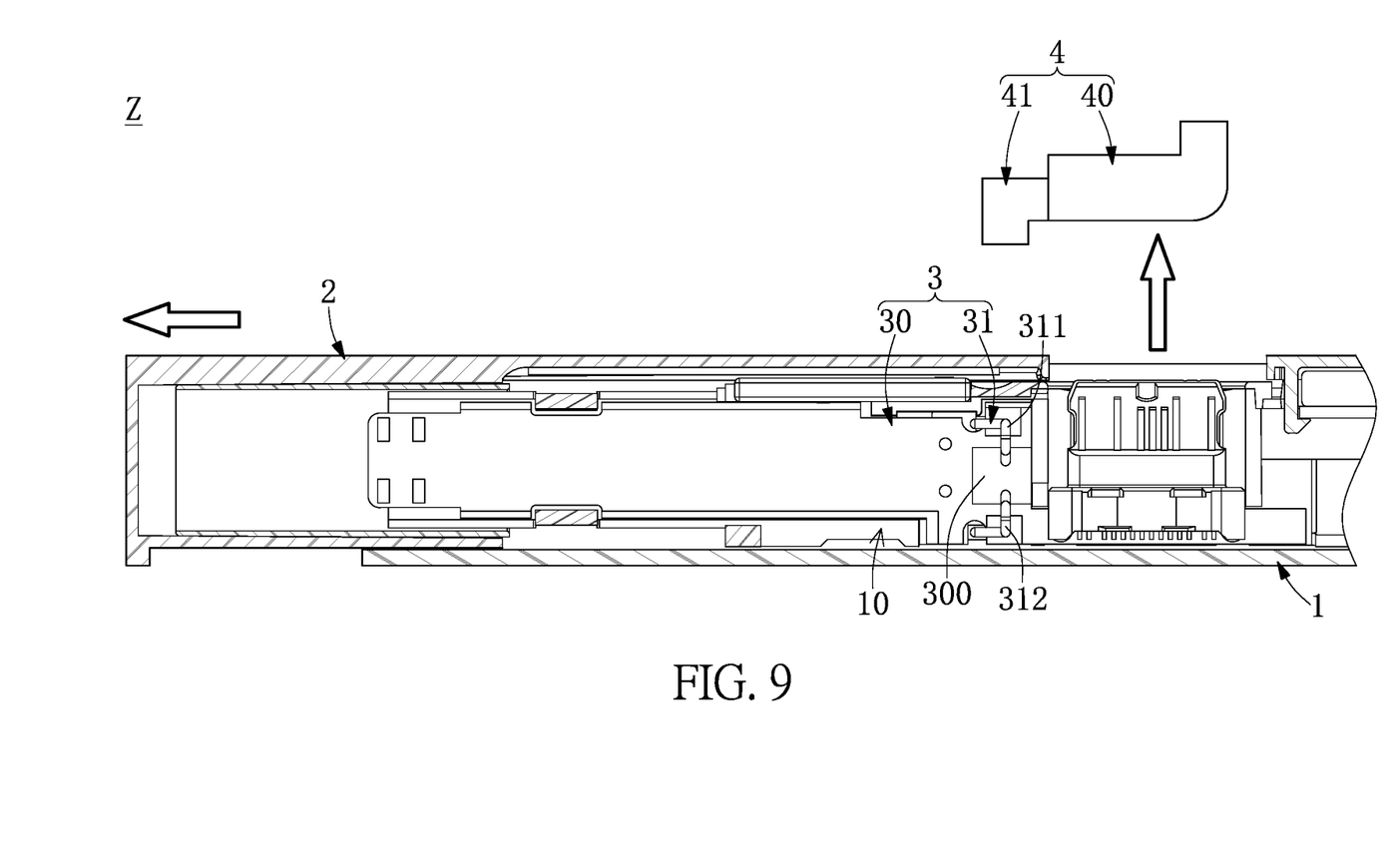
FIG. 9 is a partial sectional view of the stylus structure in a circuit ON state according to the third embodiment of the present disclosure.
Figure 10:
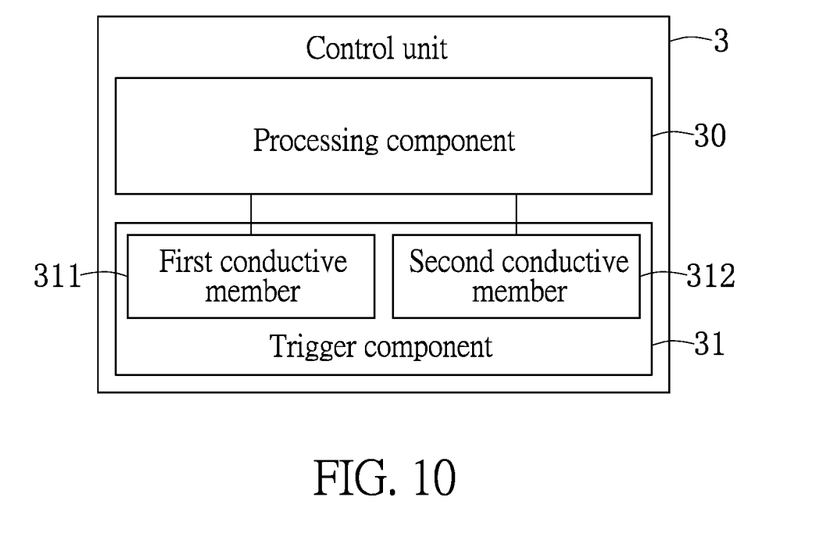
FIG. 10 is a functional block diagram according to the third embodiment of the present disclosure.

For instance, in the present disclosure, the first conductive member 311 and the second conductive member 312 can be metal conductors, but are not limited thereto. The conductive part 300 can correspond to the first conductive member 311 and the second conductive member 312. The main body 40 can be a hard plate with a certain thickness. The shield member 41 can be a film formed of insulating materials, but is not limited thereto. In conclusion, in the stylus structure Z provided in the present disclosure, the shield member 41 is disposed between the first conductive member 311 and the conductive part 300, and is also between the second conductive member 312 and the conductive part 300, so that the first conductive member 311 and the second conductive member 312 can be in the circuit OFF state, and therefore the processing component 30 is in the power OFF state.

In addition, reference is made to FIG. 2, FIG. 8, and FIG. 9. When the user wishes to use the stylus structure Z, the user can partially detach the stylus cover unit 2 from the stylus housing unit 1 to expose the opening 11. Further, the main body 40 can be moved to drive the shield member 41 away from the first conductive member 311, the second conductive member 312 and the conductive part 300. At this time, the first conductive member 311 and the second conductive member 312 are electrically connected to each other through the conductive part 300 so as to change to the circuit ON state from the circuit OFF state. Thereafter, when the first conductive member 311 and the second conductive member 312 are in the circuit ON state, the processing component 30 can change to the operating state or the power ON state from the power OFF state. Lastly, after the stylus cover unit 2 is reattached to the stylus housing unit 1 to cover the opening 11, the stylus structure Z can then be ready for use. It should be noted that a tab (which is omitted in the figures of the present disclosure) can be disposed on one end of the main body 40 distal from the trigger part 310, and the tab extends to the outside of the stylus housing unit 1 through the opening 11. Therefore, by pulling the tab, the main body 40 can be dragged to drive the shield member 41 away from the first conductive member 311, the second conductive member 312 and the conductive part 300. Moreover, the barrier unit 4 can be separated from the stylus housing unit 1 through the opening 11, but is not limited thereto.

Fourth Embodiment

Figure 11:
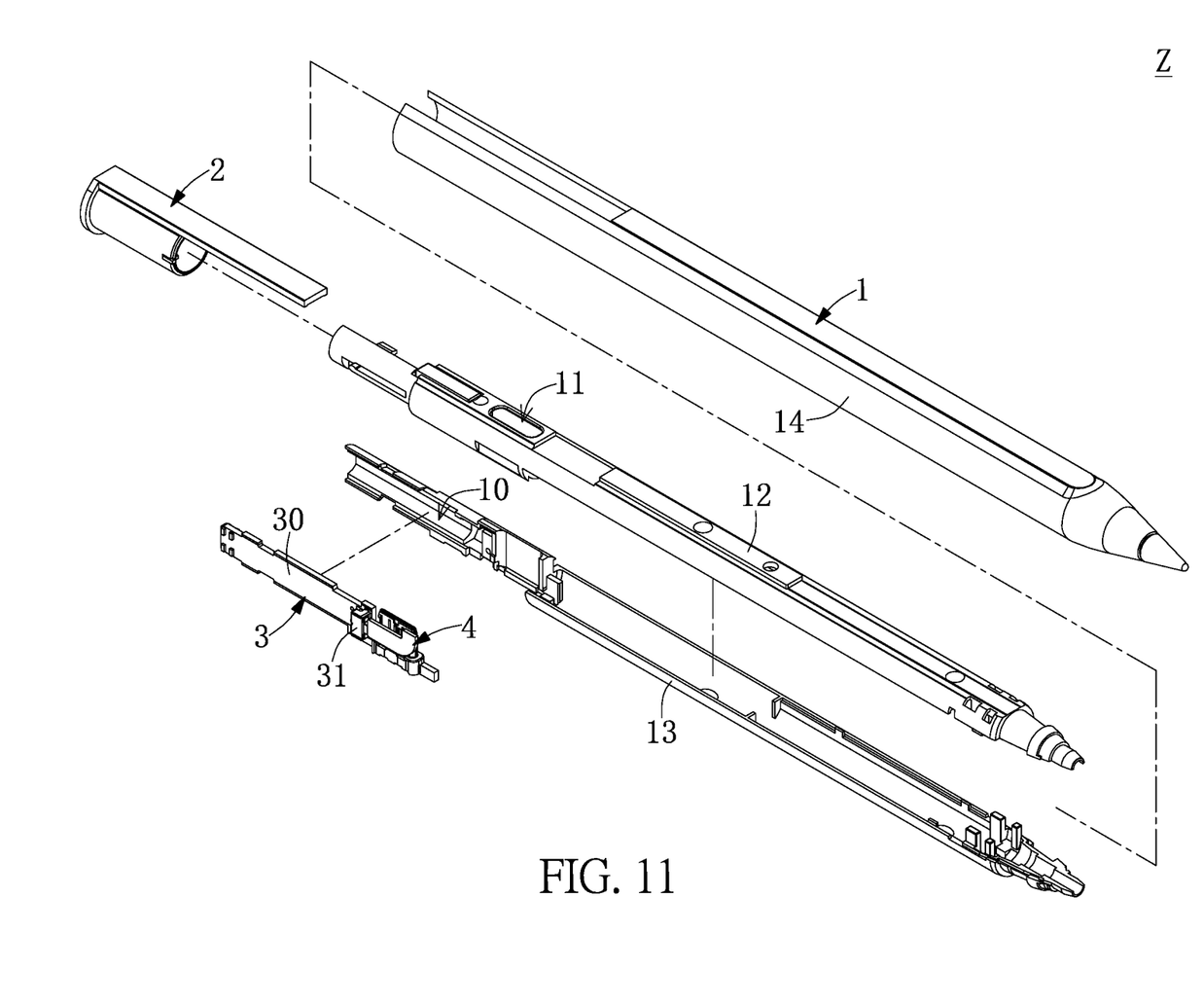
FIG. 11 is an exploded view of a stylus structure according to a fourth embodiment of the present disclosure.

Reference is made to FIG. 11, which is an exploded view of a stylus structure according to a fourth embodiment of the present disclosure, and is to be read in conjunction with FIG. 1 to FIG. 10. In the stylus structure Z of the present embodiment, the working principles of the same components and those of the stylus structure Z of the above-mentioned embodiments are similar, and descriptions thereof will be omitted herein. It should be noted that in the present embodiment, the stylus housing unit 1 can include a first case member 12, a second case member 13, and a sleeve case 14. The first case member 12 has the opening 11, and the accommodating space 10 is formed between the first case member 12 and the second case member 13. Moreover, the first case member 12 is detachably engaged with the second case member 13, and the sleeve case 14 is detachably sleeved on the first case member 12 and the second case member 13. In other words, the stylus housing unit 1 is formed by engaging the first case member 12 and the second case member 13 together, and then sleeving the sleeve case 14 onto an outside of the engaged case members 12, 13.

Fifth Embodiment

Figure 12:
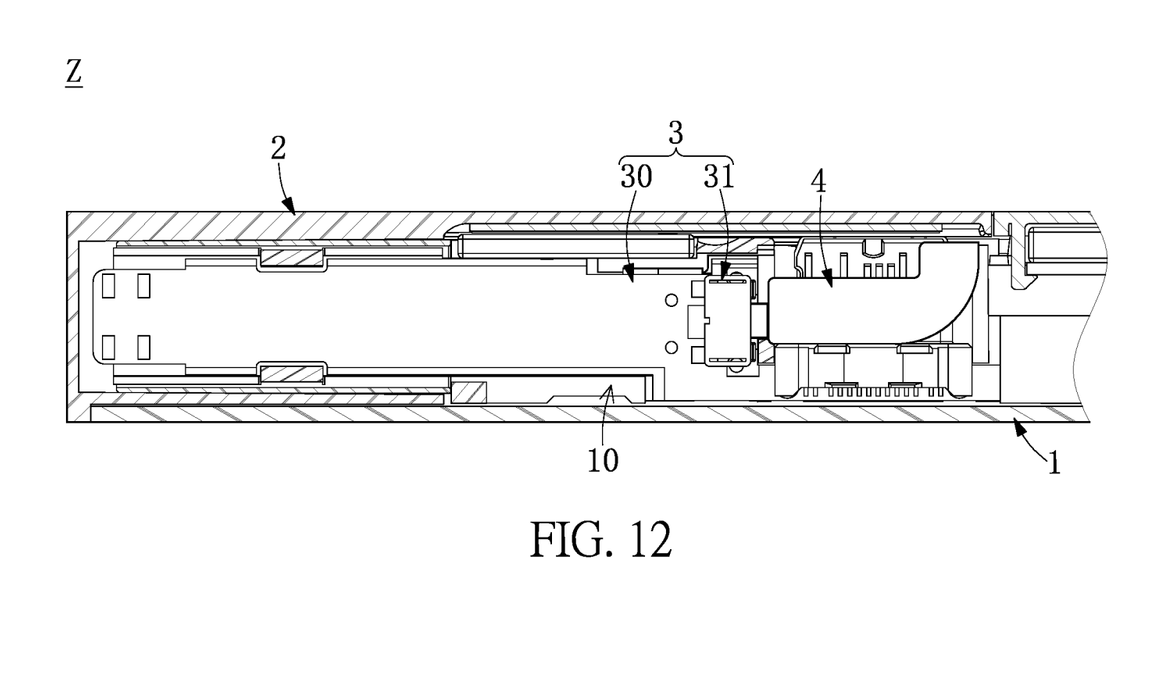
FIG. 12 is a partial sectional view of a stylus structure according to a fifth embodiment of the present disclosure.

Reference is made to FIG. 12, which is a partial sectional view of a stylus structure of a fifth embodiment of the present disclosure, and is to be read in conjunction with FIG. 1 to FIG. 11. In the fifth embodiment of the present disclosure, the stylus structure Z includes a stylus housing unit 1, a control unit 3, and a barrier unit 4. The control unit 3 includes a processing component 30 located in the stylus housing unit 1 and a trigger component 31 electrically connected to the processing component 30. The barrier unit 4 is movably disposed in the stylus housing unit 1 and is in contact with the trigger component 31. The processing component 30 is in the power OFF state when the trigger component 31 is in contact with the barrier unit 4.

For instance, in the fifth embodiment of the present disclosure, the stylus structure Z includes a stylus housing unit 1, a control unit 3, and a barrier unit 4. The stylus housing unit 1 can have a hollow structure, and the control unit 3 can be disposed inside the stylus housing unit 1. The processing component 30 can be a PCB or a component with processing and calculating functions, but is not limited thereto. The barrier unit 4 can be in contact with the trigger component 31.

Therefore, in the stylus structure Z of the present disclosure, the barrier unit 4 is disposed in the stylus housing unit 1 and is in contact with the trigger component 31, so that the processing component 30 can be in the power OFF state. Accordingly, the stylus structure Z of the present disclosure can prevent the problem of power loss due to human factors or external factors from occurring before the user purchases the same.

In addition, the barrier unit 4 abuts against the trigger part 310 of the trigger component 31, so that the trigger component can be in the circuit OFF state. Alternatively, the barrier unit 4 can be away from the trigger part 310, so that the trigger component can change to the circuit ON state from the circuit OFF state. Details on the implementation of this particular embodiment is similar to those of the foregoing second embodiment, and descriptions thereof will be omitted herein.

In further addition, the trigger component 31 can include a first conductive member 311 and a second conductive member 312 that are electrically connected to the processing component 30, and the first conductive member 311 and the second conductive member 312 are in contact with the barrier unit 4. Therefore, the first conductive member 311 and the second conductive member 312 can be in the circuit OFF state. Alternatively, the processing component has the conductive part 300, and the barrier unit 4 is away from the first conductive member 311 and the second conductive member 312, such that the first conductive member 311 and the second conductive member 312 are electrically connected to each other through the conductive part 300. Therefore, the first conductive member 311 and the second conductive member 312 can change to the circuit ON state from the circuit OFF state. Details on the implementation of this particular embodiment is similar to those of the foregoing third embodiment, and descriptions thereof will be omitted herein.

However, the above-mentioned embodiments are merely certain feasible embodiments and are not intended to limit the present disclosure.

BENEFICIAL EFFECTS OF EMBODIMENTS

In conclusion, one of the beneficial effects of the present disclosure is that the stylus structure Z provided in the present disclosure can achieve a power OFF function through the aspects of "a stylus housing unit 1 has an accommodating space 10 and an opening 11, the opening 11 is in spatial communication with the accommodating space 10", "a control unit 3 includes a processing component 30 located in the accommodating space 10 and a trigger component 31 electrically connected to the processing component 30", "a barrier unit 4 is located in the accommodating space 10 and in contact with the trigger component 31", and "the processing component 30 is in a power OFF state when the trigger component 31 is in contact with the barrier unit 4."

Another one of the beneficial effects of the present disclosure is that the stylus structure Z provided in the present disclosure can achieve a power OFF function through the aspects of "a control unit 3 includes a processing component 30 located in a stylus housing unit 1 and a trigger component 31 electrically connected to the processing component 30", "a barrier unit 4 is in contact with the trigger component 31", and "the processing component 30 is in a power OFF state when the trigger component 31 is in contact with the barrier unit 4."

Specifically, through the foregoing aspects, the stylus structure Z provided in the present disclosure can prevent the problem of power loss due to human factors or external factors from occurring before a user purchases the stylus structure Z.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A stylus structure, comprising:
a stylus housing unit having an accommodating space and an opening, the opening being in spatial communication with the accommodating space;
a stylus cover unit detachably sleeved on the stylus housing unit;
a control unit including a processing component located in the accommodating space and a trigger component electrically connected to the processing component; and
a barrier unit located in the accommodating space, the barrier unit being in contact with the trigger component;
wherein the processing component is in a power OFF state when the trigger component is in contact with the barrier unit;
wherein the trigger component includes a first conductive member and a second conductive member that are electrically connected to the processing component, the first conductive member and the second conductive member are in contact with the barrier unit so as to be in the circuit OFF state, and the processing component is in the power OFF state when the first conductive member and the second conductive member are in the circuit OFF state.

2. The stylus structure according to claim 1, wherein the processing component has a conductive part, the barrier unit is away from the first conductive member and the second conductive member so that the first conductive member and the second conductive member are electrically connected to each other through the conductive part, and the processing component changes to an operating state when the first conductive member and the second conductive member are in the circuit ON state.

3. A stylus structure, comprising:
a stylus housing unit;
a control unit including a processing component located in the stylus housing unit, the control unit being electrically connected to a trigger component of the processing component; and
a barrier unit located in the stylus housing unit, the barrier unit being in contact with the trigger component;
wherein the processing component is in a power OFF state when the trigger component is in contact with the barrier unit;
wherein the trigger component includes a first conductive member and a second conductive member that are electrically connected to the processing component, the first conductive member and the second conductive member are in contact with the barrier unit so as to be in a circuit OFF state, and the processing component is in the power OFF state when the first conductive member and the second conductive member are in the circuit OFF state.

4. The stylus structure according to claim 3, wherein the processing component has a conductive part, the barrier unit is away from the first conductive member and the second conductive member so that the first conductive member and the second conductive member are electrically connected to each other through the conductive part, and the processing component changes to an operating state when the first conductive member and the second conductive member are in the circuit ON state.

* * * * *